(12) United States Patent
Imanuel et al.

(10) Patent No.: US 11,989,984 B2
(45) Date of Patent: May 21, 2024

(54) ELECTRONIC LOCK PAIRING VIA PASSCODE

(71) Applicant: ASSA ABLOY Americas Residential Inc., New Haven, CT (US)

(72) Inventors: Derek Imanuel, Irvine, CA (US); Kevin Pasma, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 359 days.

(21) Appl. No.: 17/195,245

(22) Filed: Mar. 8, 2021

(65) Prior Publication Data

US 2021/0279983 A1 Sep. 9, 2021

Related U.S. Application Data

(60) Provisional application No. 62/987,051, filed on Mar. 9, 2020.

(51) Int. Cl.
*G07C 9/00* (2020.01)
*G07C 9/20* (2020.01)
*H04W 4/80* (2018.01)

(52) U.S. Cl.
CPC ......... *G07C 9/00309* (2013.01); *G07C 9/215* (2020.01); *H04W 4/80* (2018.02); *G07C 2009/00396* (2013.01)

(58) Field of Classification Search
None
See application file for complete search history.

(56) References Cited

U.S. PATENT DOCUMENTS

| 9,424,700 | B2 | 8/2016 | Lovett et al. | |
| 9,659,424 | B2* | 5/2017 | Huber | G07C 9/00571 |
| 2014/0375422 | A1* | 12/2014 | Huber | G07C 9/00571 340/5.61 |

(Continued)

FOREIGN PATENT DOCUMENTS

| CN | 107178255 A | 9/2017 |
| WO | 2017172871 A1 | 10/2017 |

(Continued)

OTHER PUBLICATIONS

International Search Report and Written Opinion for International Application No. PCT/US2021/020999, dated Mar. 5, 2021.

*Primary Examiner* — Carlos Garcia
(74) *Attorney, Agent, or Firm* — Merchant & Gould PC

(57) ABSTRACT

Secure passcode-triggered wireless communication pairing of a mobile device with an electronic lock is provided. The passcode is a limited-use (e.g., one time use, useful for a limited time span) pairing passcode that may be generated at the electronic lock or by an application executing on an administrative user's mobile device that can be communicated to a guest user as part of an invitation to connect to the electronic lock. The pairing passcode is not a lock actuation passcode and cannot be used to actuate the electronic lock from a locked to an unlocked position. Rather, the pairing passcode enables the guest user to pair a mobile device with the electronic lock and, once paired, to use an application executing on the guest user's mobile device to actuate the electronic lock.

17 Claims, 13 Drawing Sheets

(56) References Cited

U.S. PATENT DOCUMENTS

| | | | |
|---|---|---|---|
| 2015/0067792 A1* | 3/2015 | Benoit | H04W 12/04 |
| | | | 726/5 |
| 2015/0267438 A1* | 9/2015 | Martinez | G07C 9/00182 |
| | | | 70/278.1 |
| 2016/0180618 A1 | 6/2016 | Ho et al. | |
| 2016/0191499 A1* | 6/2016 | Momchilov | H04L 9/0894 |
| | | | 713/171 |
| 2016/0371907 A1 | 12/2016 | Ma et al. | |
| 2019/0172285 A1 | 6/2019 | Jin | |
| 2019/0327098 A1 | 10/2019 | Hart | |
| 2021/0158067 A1 | 5/2021 | Hsu et al. | |
| 2022/0172533 A1* | 6/2022 | Omori | H04W 84/10 |
| 2023/0056890 A1* | 2/2023 | Pasma | G07C 9/23 |

FOREIGN PATENT DOCUMENTS

| | | |
|---|---|---|
| WO | 2020056272 A1 | 3/2020 |
| WO | 2020056277 A1 | 3/2020 |

* cited by examiner

ELECTRONIC LOCK PAIRING VIA PASSCODE

PRIORITY CLAIM

This application claims priority to U.S. Provisional Application Ser. No. 62/987,051, filed on Mar. 9, 2020, the entire disclosure of which is hereby expressly incorporated herein by reference.

TECHNICAL FIELD

This invention relates to the field of electronic locks. More particularly, this invention relates to systems and methods of providing secure passcode-triggered wireless communication pairing of a mobile device with an electronic lock.

BACKGROUND

Electronic locks have gained increasing acceptance and widespread use in residential and commercial markets due to the many benefits they provide. One such benefit is the ability to lock or unlock a door with the use of a mobile device, such as a smartphone or tablet. This is not only useful for the owner or tenant of the premises where the electronic lock is installed, but can also be useful for enabling a guest user to lock and unlock the door with a mobile device rather than furnishing the guest user with a physical key. For example, a guest user may be an individual whom the owner wishes to grant access to perform permitted actions (e.g., lock, unlock, add a lock actuation passcode) associated with the electronic lock, oftentimes for a temporary time period. For increased security against man-in-the-middle (MITM) attacks, denial of service, or other attack vectors, current electronic locks may require a physical actuation of a pairing button that is located on an interior assembly of the electronic lock that is mounted to the interior side of the door. For example, actuation of the pairing button may trigger the electronic lock to enter a wireless (e.g., Bluetooth®) pairing mode, wherein requirement of a physical actuation of the pairing button can limit the time window where the electronic lock is available for Bluetooth® pairing.

A disadvantage of this security measure, however, is that the guest user is not enabled to pair a mobile device with the electronic lock in order to actuate the lock without already having access to the interior side of the door. Accordingly, in order to give the guest user access to the interior side of the door, the owner may be required to be present at the premises. Not only is this an inconvenience, but there are various scenarios where this may be infeasible for the owner.

Accordingly, a secure system and method for enabling a guest user to pair a mobile device with an electronic lock without requiring access to the interior assembly of the electronic lock is needed.

SUMMARY

The present disclosure relates generally to systems and methods for providing secure passcode-triggered wireless communication pairing of a mobile device with an electronic lock.

In a first aspect, an electronic lock is provided, wherein the electronic lock comprises: a latch assembly including a bolt movable between a locked position and an unlocked position; a motor configured to receive actuation commands causing the motor to move the bolt from the locked position to the unlocked position or from the unlocked position to the locked position; a keypad for receiving a user input; a wireless circuit configured to communicate wirelessly with an application installed on a mobile device; at least one processor; a memory communicatively connected to the processor, the memory storing a pairing passcode and instructions which, when executed, cause the electronic lock to: receive, via the keypad, user input of the pairing passcode, wherein the pairing passcode is provided to a guest user via an application installed on the mobile device responsive to an invitation provided to the guest user initiated by an administrative user account associated with the electronic lock; and enter into a wireless communication pairing mode that enables the electronic lock to pair with the mobile device when the mobile device is within wireless communication range of the electronic lock.

In another aspect, a method is provided for providing secure passcode-triggered wireless communication pairing of a mobile device with an electronic lock, comprising: generating a pairing passcode; storing the pairing passcode; receiving, via a keypad, user input of the pairing passcode, wherein the pairing passcode is provided to a guest user via an application installed on the mobile device responsive to an invitation provided to the guest user initiated by an administrative user associated with the electronic lock; entering into a wireless communication pairing mode; and establishing a wireless communication channel with the mobile device when the mobile device is within wireless communication range of the electronic lock.

In another aspect, a system is provided for providing secure passcode-triggered wireless communication pairing of a mobile device with an electronic lock, the system comprising: at least one processor; a memory communicatively connected to the at least one processor, the memory storing instructions which, when executed, cause the system to: provide, on a first mobile device, a user interface; receive, via the user interface, a selection to allow a guest user to pair a second mobile device with an electronic lock; receive, via the user interface, contact information associated with the guest user; generate an invitation link associated with the electronic lock; send a message including the invitation link to the second mobile device using the contact information associated with the guest user, wherein the invitation link, when selected, allows the second mobile device to: install an application to operate on the second mobile device; use the application to create a guest user account associated with the electronic lock; and use the application to display a pairing passcode associated with the electronic lock that, when entered using a keypad of the electronic lock, initiates a wireless communication pairing mode that enables the electronic lock to pair with the second mobile device when the mobile device is within wireless communication range of the electronic lock.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
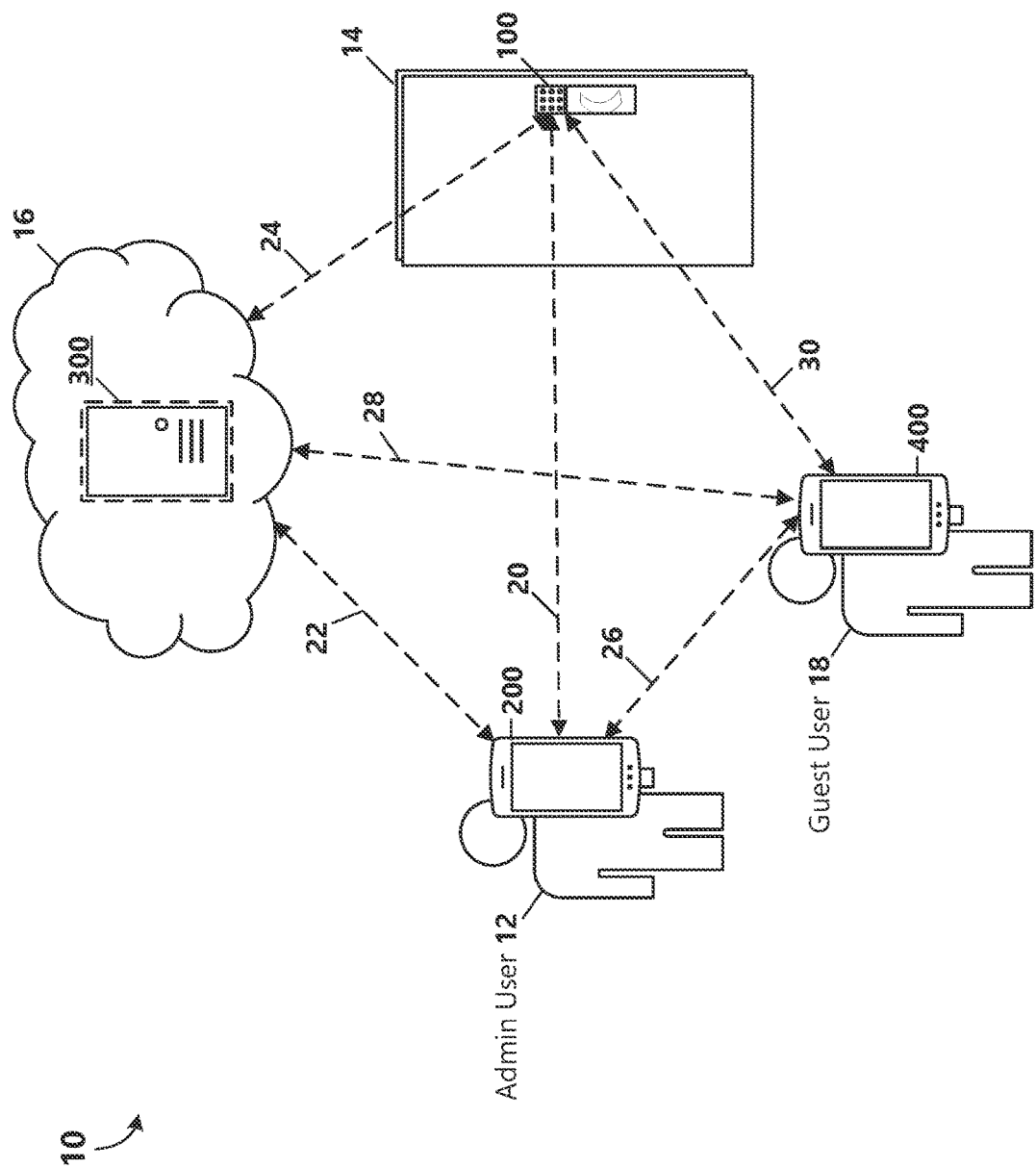
FIG. 1 illustrates an environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to providing a secure passcode-triggered pairing mode of an electronic lock. The passcode is a limited-use (e.g., one time use, useful for a limited time span) pairing passcode that may be generated at the electronic lock or by an application executing on an administrative user's mobile device that can be communicated to a guest user as part of an invitation to connect to the electronic lock. The pairing passcode is not a lock actuation passcode and cannot be used to actuate the electronic lock from a locked to an unlocked position. Rather, the pairing passcode enables the guest user to pair a mobile device with the electronic lock and, once paired, to use an application executing on the guest user's mobile device to actuate the electronic lock.

In example aspects, various wireless protocols can be used. In example embodiments, a Wi-Fi protocol (802.11x) may be used to connect the electronic lock to a server (cloud) device, while a different wireless protocol (e.g., Bluetooth®, including Bluetooth® Low Energy, or BLE) is used for short-range communication between the electronic lock and other devices, such as a mobile device used to actuate the lock. In other embodiments, various other wireless protocols can be used, such as other short- or long-range wireless protocols (e.g., cellular, RFID/NFC, Zigbee®, Z-Wave®, etc.).

The term "lock" or "lockset" is broadly intended to include any type of lock, including but not limited to, deadbolts, knob locks, lever handle locks, mortise locks, and slide locks, whether mechanical, electrical, or electro-mechanical locks. The locking points may have various mounting configurations and/or locations, including but not limited to: mortised within the doorframe, mounted externally to the doorframe or support structure, and/or affixed directly to the door.

Although this disclosure describes these features as implemented on an electronic deadbolt lock for purposes of example, these features are applicable to any type of lockset, including but not limited to, deadbolts, knobset locks, handleset locks, etc. Still further, example aspects of the present application can be applied to other types of IoT devices for which security is an issue, e.g., wireless/interconnected home devices that store user data.

FIG. 1 illustrates an environment 10 in which aspects of the present disclosure may be implemented. A door 14 comprising an electronic lock 100 (also referred to as a wireless electronic lockset) is installed at a premises. An administrative user 12 is a master user or an authorized person, such as an owner or tenant of the premises where the door 14 comprising the electronic lock 100 is installed. The administrative user 12 has mobile device (herein referred to as admin mobile device 200) with wireless communication capabilities, such as a smartphone or tablet. The admin mobile device 200 is capable of communicating 22 with a server 300, communicating 20 with the electronic lock 100, and communicating 26 with a phone or other mobile device (herein referred to as guest mobile device 400) of a guest user 18.

The guest user 18 is a person whom the administrative user 12 may wish to grant access to perform at least a subset of actions (e.g., lock, unlock, change settings) associated with the electronic lock 100. In some examples, the guest user 18 may be a short-time guest, such as a vacation rental user. The administrative user 12 may wish to allow the guest user 18 to pair the guest mobile device 400 with the electronic lock 100 for enabling the guest user 18 to perform electronic lock actions via the guest mobile device 400. The administrative user 12 may wish to allow the guest user 18 to pair the guest mobile device 400 with the electronic lock 100 without requiring the admin mobile device 200 to be within wireless communication range of the electronic lock 100 nor the guest user 18 to actuate a pairing button of the electronic lock 100. For example, the pairing button may be located on the interior of the door, which, prior to aspects of the present disclosure, may require that the guest user 18 have access to an interior of the premises to actuate the pairing button. The guest mobile device 400 is capable of communicating 28 with the server 300, communicating 30 with the electronic lock 100, and communicating 26 with the admin mobile device 200.

The server 300 can be, for example, a physical server or a virtual server hosted in a cloud storage environment 16. In some embodiments, the electronic lock 100 is also capable of communicating 24 with the server 300. Such communication can optionally occur via one or more wireless communication protocols, e.g., Wi-Fi (IEEE 802.11), short-range wireless communication to a Wi-Fi bridge, or other connection mechanism. According to an embodiment, the server 300 generally creates and stores an administrative user account associated with the electronic lock 100, stores a pairing passcode for the electronic lock, stores a guest user account associated with the electronic lock, and in some examples, upon creation of the guest user account, provides the pairing passcode to the guest mobile device 400. According to an aspect, when the pairing passcode is successfully entered using a keypad of the electronic lock 100, the electronic lock 100 may enter a pairing mode which enables the electronic lock 100 to pair with the guest mobile device 400 over a Bluetooth connection.

Figure 2:
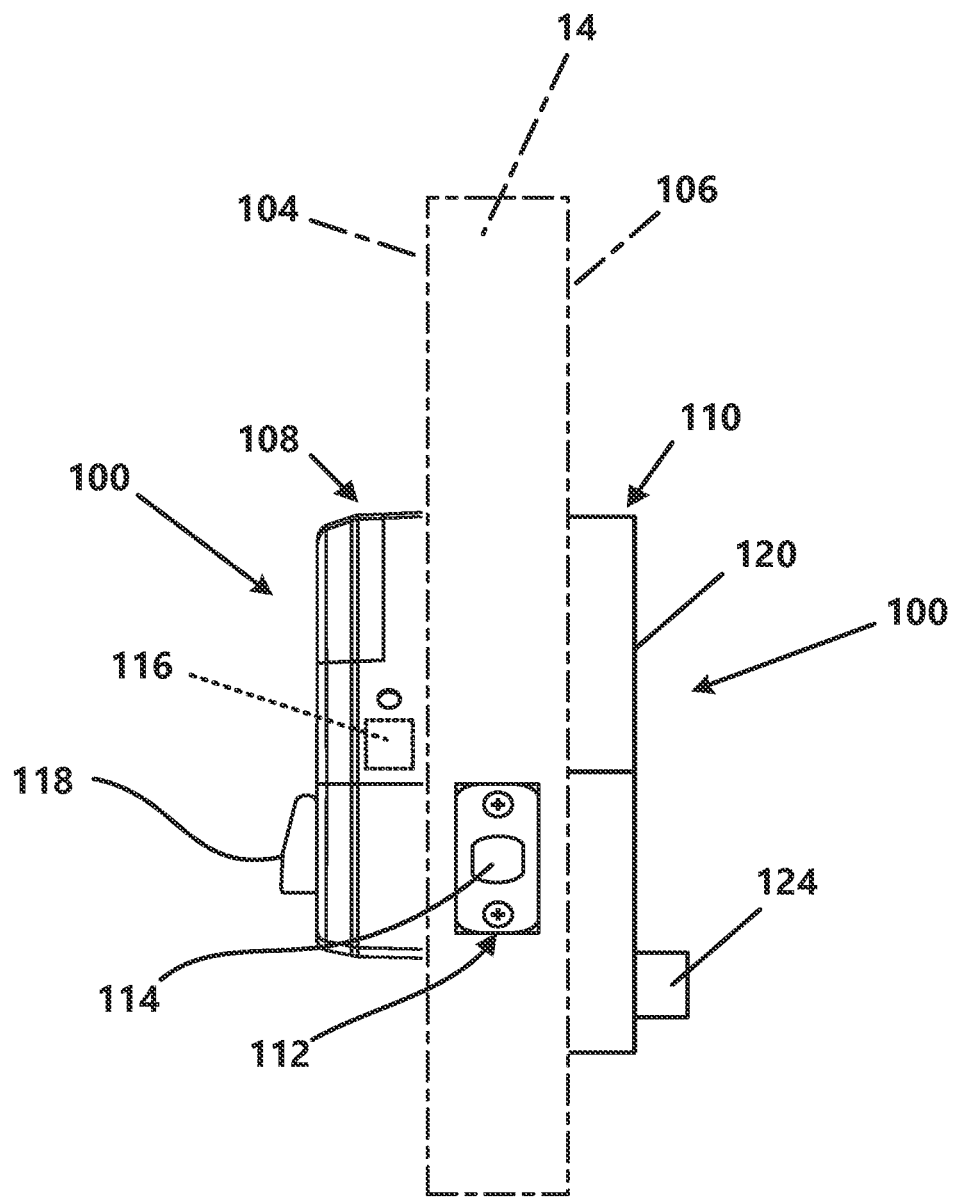
FIG. 2 illustrates a side view of a portion of the electronic lock seen in the environment of FIG. 1.
Figure 3:
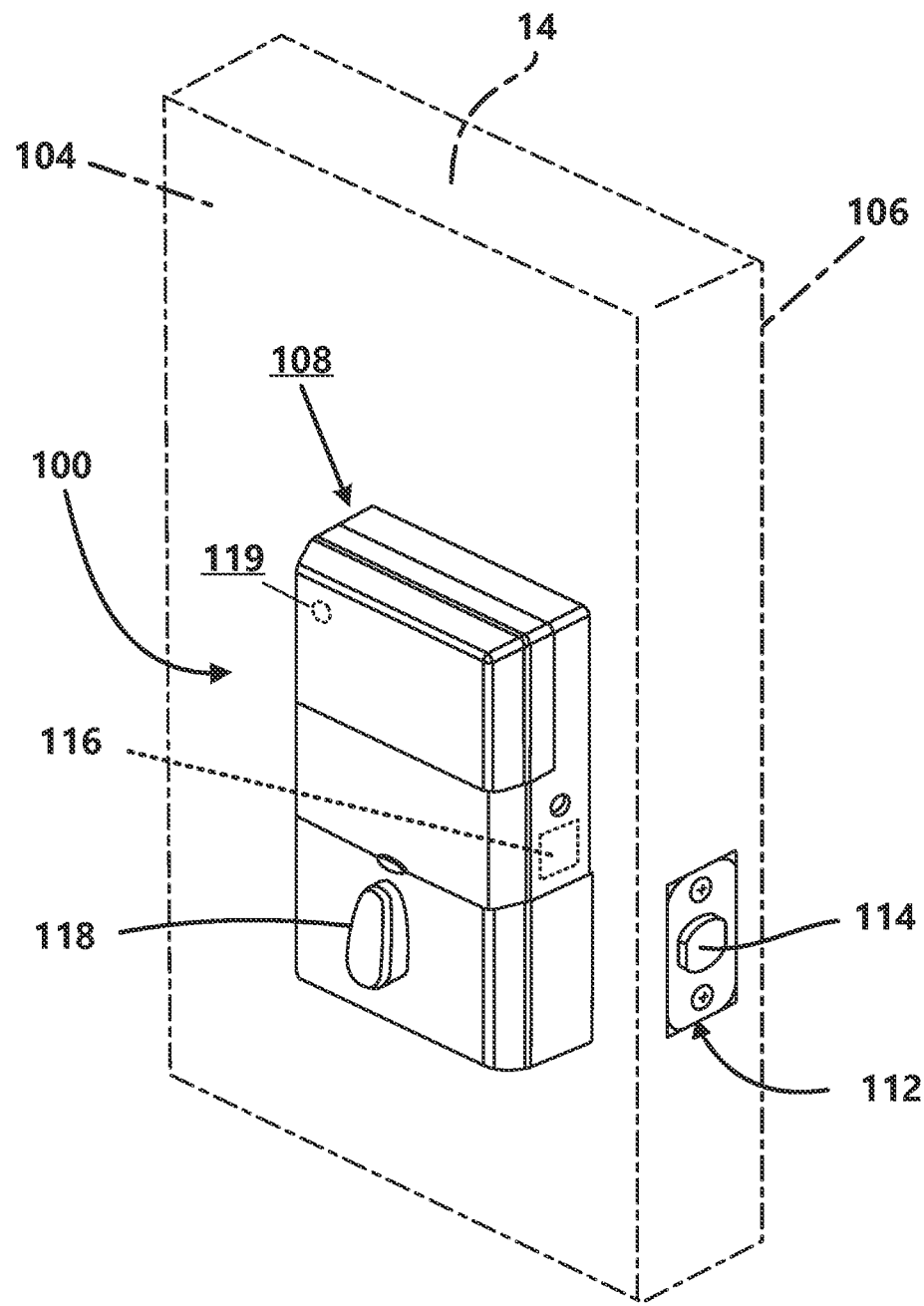
FIG. 3 illustrates a rear perspective view of a portion of the electronic lock seen in the environment of FIG. 1.
Figure 4:
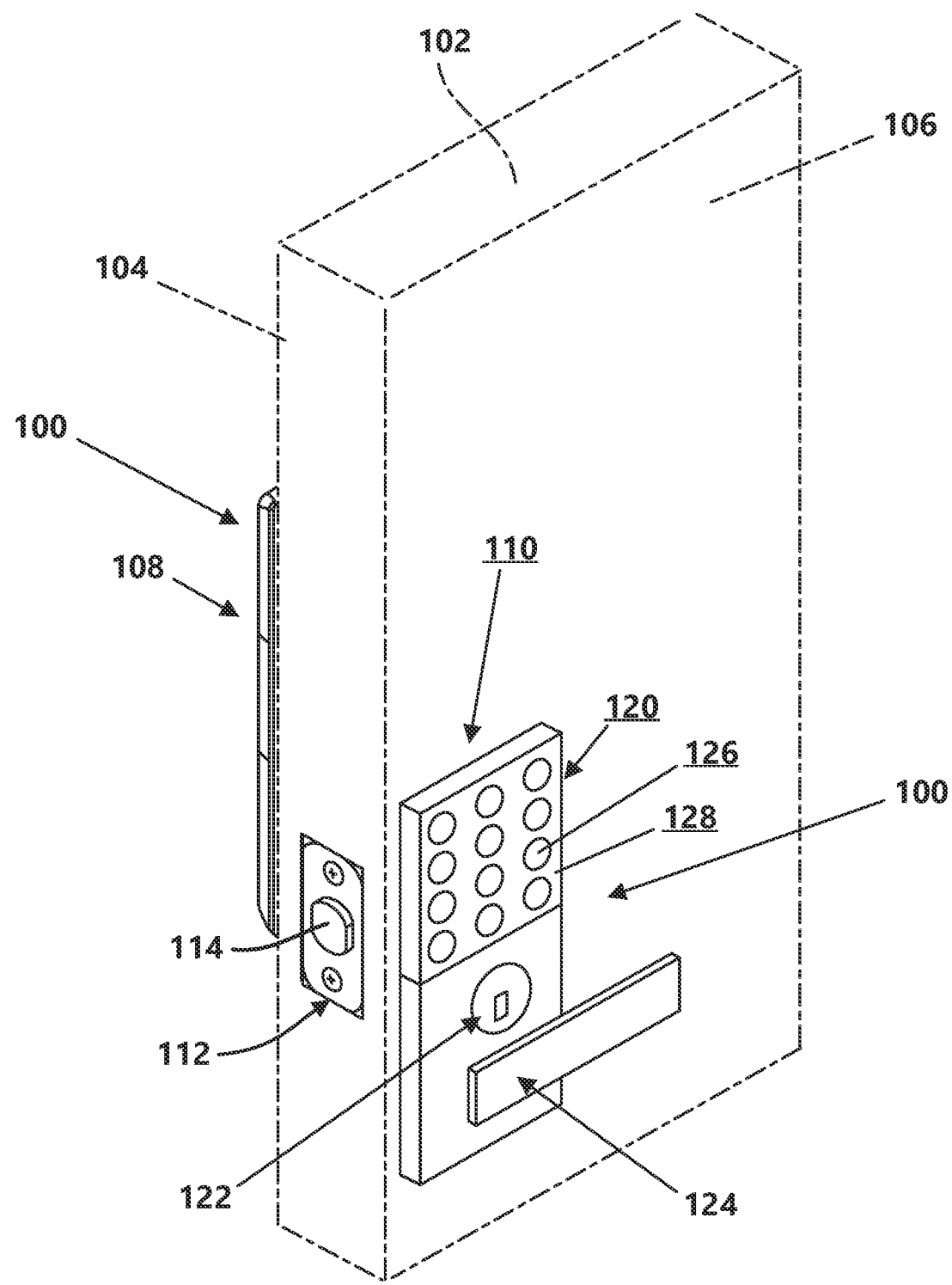
FIG. 4 illustrates a front perspective view of a portion of the electronic lock seen in the environment of FIG. 1.

FIGS. 2-4 illustrate an electronic lock 100 as installed at a door 14, according to one example of the present disclosure. The door 14 has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 14 is in an unlocked state. When the bolt 114 is extended, the bolt 114 protrudes from the door 14 into a doorjamb (not shown) to place the door in a locked state.

In some examples, the interior assembly 108 is mounted to the interior side 104 of the door 14, and the exterior assembly 110 is mounted to the exterior side 106 of the door 14. The latch assembly 112 is typically at least partially mounted in a bore formed in the door 14. The term "outside" is broadly used to mean an area outside the door 14 and "inside" is broadly used to denote an area inside the door 14. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turn piece 118 that can be used on the interior side 104 of door 14 to move the bolt 114 between the extended and retracted positions. The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device, and may be embodied as a standalone unit or as a device shared with components of the electronic lock 100. The processing unit 116 may include memory communicatively interfaced to the processor, for storing the software instructions. Alternatively, the electronic lock 100 may further comprise a separate memory device for storing the software instructions that is electrically connected to the processing unit 116 for the bi-directional communication of the instructions, data, and signals therebetween.

In some examples, the interior assembly 108 includes a pairing button, which when actuated, initiates a BLE communication pairing mode. For example, the pairing mode may enable the electronic lock 100 to communicate with a mobile device (e.g., admin mobile device 200, guest mobile device 400) within wireless communication range for enabling the mobile device to be paired with the electronic lock 100. As can be appreciated, initiating the BLE pairing mode via an actuation of the pairing button 119 may be limited to users who have access to the interior side 104 of the door 14. As will be described in further detail below, aspects of the present disclosure enable a guest user 18 to initiate a BLE communication pairing mode with electronic lock 100 (with permission of the administrative user 12) without requiring the guest user 18 to already have access to the interior side 104 of the door 14.

Referring to FIG. 4, the exterior assembly 110 can include exterior circuitry communicatively and electrically connected to the processing unit 116. For example, the exterior assembly 110 can include a keypad 120 for receiving a user input and/or a keyway 122 for receiving a key (not shown). The exterior side 106 of the door 14 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid actuation passcode into the keypad 120, the bolt 114 is moved between the extended and retracted positions. In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 14. When the user inputs a valid actuation passcode via the keypad 120 that is recognized by the processing unit 116, an electrical motor is energized to retract the bolt 114 of latch assembly 112, thus permitting door 14 to be opened from a closed position. In a particular embodiment, when a guest user 18 inputs a valid pairing passcode into the keypad 120, the electronic lock 100 may enter into a pairing mode where the electronic lock 100 is enabled to communicate and be paired with the guest mobile device 400 when the guest mobile device is within wireless communication range of the electronic lock 100. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. The keypad 120 can have a plurality of characters displayed thereon. For example, the keypad 120 can include a plurality of buttons 126 that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In alternative embodiments, one or more other types of user interface devices can be incorporated into the electronic lock 100. For example, in example implementations, the exterior assembly 110 can include a biometric interface (e.g., a fingerprint sensor, retina scanner, or camera including facial recognition), or an audio interface by which voice recognition could be used to actuate the lock. Still further, other touch interfaces may be implemented, e.g., where a single touch may be used to actuate the lock rather than requiring entry of a specified actuation passcode.

Figure 5:
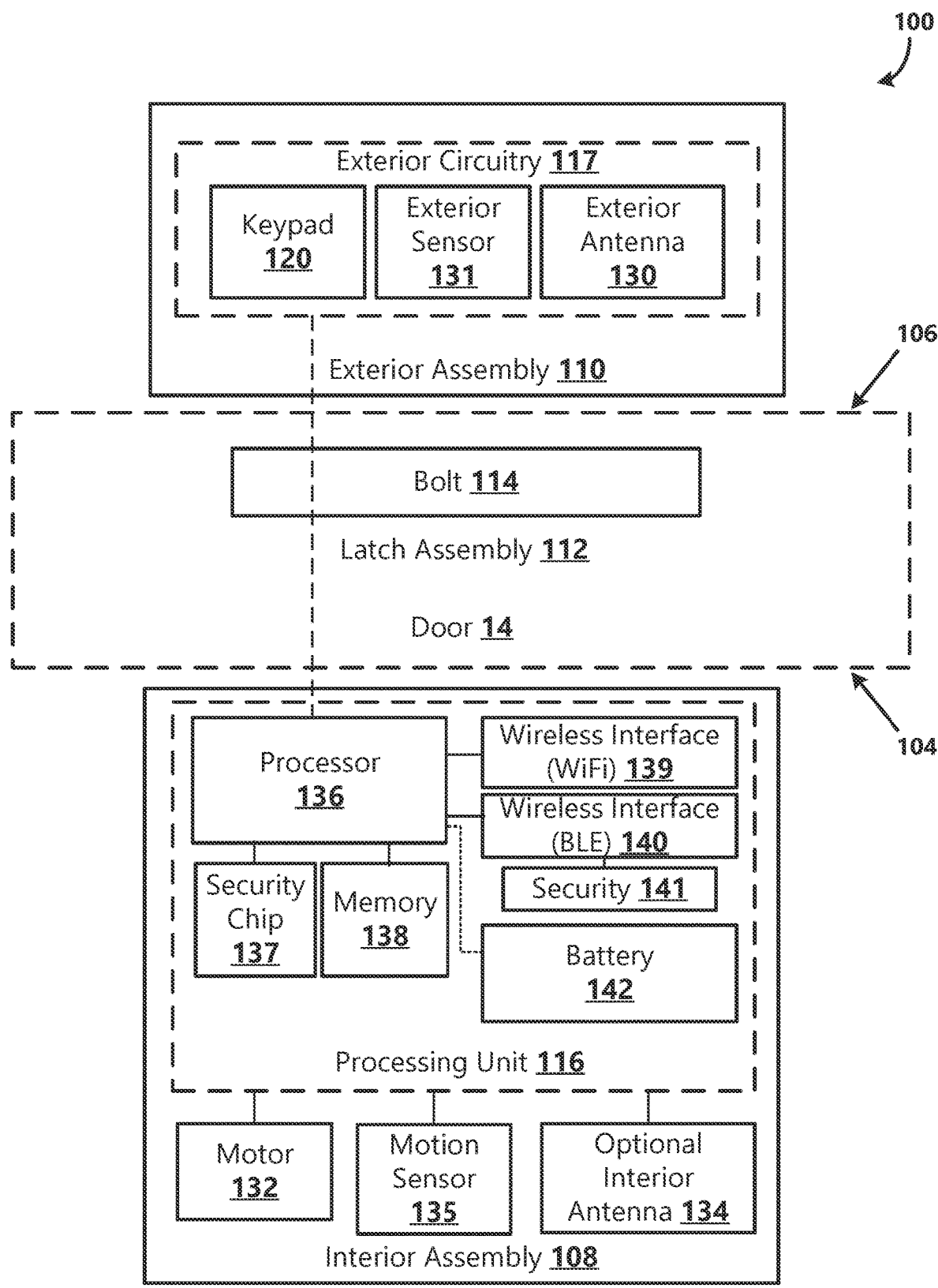
FIG. 5 illustrates a schematic representation of the electronic lock seen in the environment of FIG. 1.

FIG. 5 is a schematic representation of the electronic lock 100 mounted to the door 14. The interior assembly 108, the exterior assembly 110, and the latch assembly 112 are shown.

The exterior assembly 110 is shown to include the keypad 120 and an optional exterior antenna 130 usable for communication with a remote device. In addition, the exterior assembly 110 can include one or more sensors 131, such as a camera, proximity sensor, or other mechanism by which conditions exterior to the door 14 can be sensed. In response to such sensed conditions, notifications may be sent by the electronic lock 100 to a server 300, admin mobile device 200, or guest mobile device 400 including information associated with a sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device (e.g., admin mobile device 200 or guest mobile device 400) that is paired with the electronic lock 100 and determined to be located on the exterior of the door 14 is able to actuate (unlock or lock) the door. This prevents unauthorized users from being located exterior to the door 14 of the electronic lock 100 and taking advantage of an authorized mobile device that may be located on the interior of the door, even though that authorized mobile device is not being used to actuate the lock. However, such a feature is not required, but can add additional security. In alternative arrangements, the electronic lock 100 is only actuatable from either the keypad 120 (via entry of a valid actuation passcode) or from an application installed on the mobile device (e.g., admin mobile device 200 or guest mobile device 400). In such arrangements, because touch alone at the exterior of the door 14 cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and/or a Bluetooth interface 140), and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the electronic lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information usable to generate a certificate usable to validate the electronic lock 100 with a remote system, such as the server 300 or mobile device (e.g., admin mobile device 200 or guest mobile device 400). In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with server 300 or one or more mobile devices 200, 400. Accordingly, once written, such cryptographic information can be used in a certificate generation process which ensures that, if any of the characteristics reflected in the cryptographic information are changed, the certificate that is generated by the security chip 137 would become invalid, and thereby render the electronic lock 100 unable to perform various functions, such as communicate with the server 300 or mobile device 200, 400, or operate at all, in some cases.

In some embodiments, the security chip 137 may be configured to generate a pairing passcode that, when entered using the keypad 120 of the electronic lock 100, triggers a BLE pairing mode of the electronic lock 100 that enables the electronic lock 100 to pair with a proximate mobile device (e.g., guest mobile device 400 on which an electronic lock application associated with the electronic lock 100 is operating). In some examples, the pairing passcode is provided to the administrative user 12 upon initial setup/activation of the electronic lock 100 (e.g., via an electronic lock application associated with the electronic lock 100 operating on the admin mobile device 200). In some examples, the pairing passcode is a random value. In some examples, the administrative user 12 may be enabled to change the pairing passcode by setting their own code or by requesting a random value to be generated by the electronic lock application operating on the admin mobile device 200. In some examples, the length of the pairing passcode is variable. According to an aspect, for increased security, the pairing passcode may be a limited-use passcode. For example, the pairing passcode may be limited to a single use or may be active for a preset or administrative user-selected time duration. In further examples, a digit of the pairing passcode may correspond to a setting that may instruct the electronic lock 100 to perform one or more of: disable the pairing passcode after it has been used; keep the pairing passcode enabled after is as been used; or reset the pairing passcode to a new random value after it has been used.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and/or a Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or both of the mobile device 200,400 and server 300 via the Wi-Fi interface, and can communicate with the mobile device 200,400 when the mobile device is in proximity to the electronic lock 100 via the Bluetooth interface 140. In some embodiments, the processing unit 116 is configured to communicate with the mobile device 200, 400 via the Bluetooth interface 140, and communications between the mobile device 200,400 and electronic lock 100 when the mobile device 200, 400 is out of range of Bluetooth wireless signals can be relayed via the server 300, e.g., via the Wi-Fi interface 139.

Of course, in alternative embodiments, other wireless protocols could be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device 200, 400 for communication of an intent to actuate the electronic lock 100. As illustrated in further detail below, the processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user (e.g., administrative user 12 or guest user 18) of a mobile device 200, 400 may access an account associated with the electronic lock 100 to view and modify settings of that lock, which are then propagated from the server 300 to the electronic lock 100. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example, a cryptographic circuit capable of storing cryptographic information and generating encryption keys usable to generate certificates for communication with other systems, e.g., mobile device 200, 400.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection).

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 14 is locked and the motor 132 receives a lock command, then no action is taken. If the door 14 is locked and the motor 132 receives an unlock command, then the motor 132 actuates the bolt 114 to unlock the door 14.

As noted above, the optional interior antenna 134 may also be located in the interior assembly 108. In some examples, the interior antenna 134 is capable of operating together with the exterior antenna 130 to determine the location of the mobile device 200, 400. In some examples, only a mobile device determined to be located on the exterior side 106 of the door 14 is able to unlock (or lock) the door 14. This prevents unauthorized users from being located near the electronic lock 100 and taking advantage of an authorized mobile device that may be located on the interior assembly 108 of the door 14, even though the authorized mobile device is not being used to unlock the door 14. In alternative embodiments, the interior antenna 134 can be excluded entirely, since the electronic lock 100 is actuated only by an authorized mobile device.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In still further example embodiments, the electronic lock 100 can include an integrated motion sensor 135. Using such a motion sensor (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200, 400 in proximity to the electronic lock 100.

Of course, in alternative embodiments, other lock actuation sequences may not require use of a motion sensor 135. For example, if the mobile device 200, 400 is in valid range of the electronic lock 100 when using a particular wireless protocol (e.g., Bluetooth Low Energy), then a connection will be established with the electronic lock 100. Other arrangements are possible as well, using other connection sequences and/or communication protocols.

Figure 6:
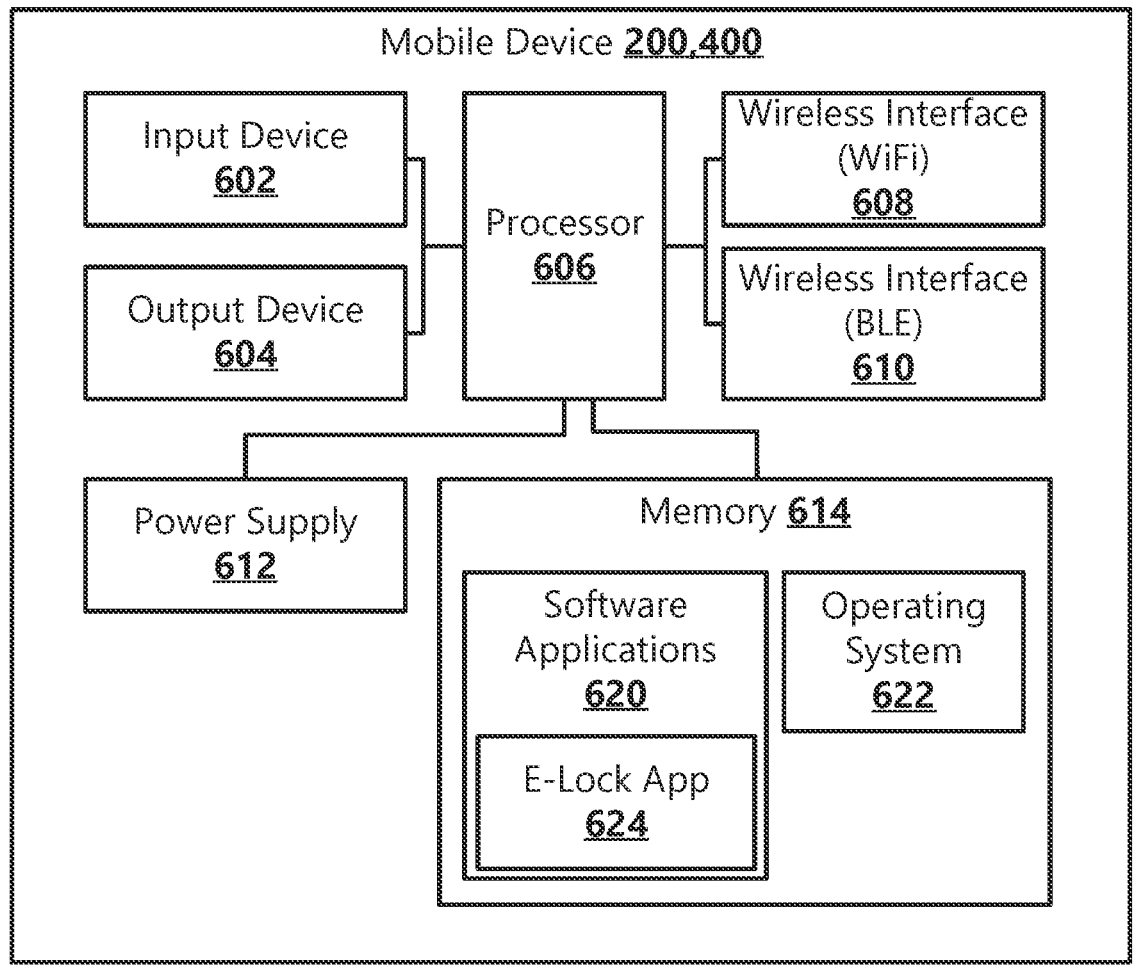
FIG. 6 illustrates a schematic representation of a mobile device seen in the environment of FIG. 1.

FIG. 6 illustrates a schematic diagram of a mobile device, such as admin mobile device 200 and guest device 400, usable in embodiments of the disclosure to enable Bluetooth® pairing with the electronic lock 100 via a pairing passcode. In some embodiments, the mobile device 200, 400 operates to form a Bluetooth or BLE connection with a network enabled security device such as the electronic lock 100. The mobile device 200, 400 then communicates with the cloud server 300 via a Wi-Fi or mobile data connection. The mobile device 200, 400 thus can operate to communicate information between the electronic lock 100 and the server 300. The mobile device 200, 400 shown in FIG. 6 includes an input device 602, an output device 604, a processor 606, a wireless Wi-Fi interface 608, a wireless BLE interface 610, a power supply 612, and a memory 614.

The input device 602 operates to receive input from external sources. Such sources can include inputs received from a user (e.g., the administrative user 12 or the guest user 18). The inputs can be received through a touchscreen, a stylus, a keyboard, etc.

The output device 604 operates to provide output of information from the mobile device 200, 400. For example, a display can output visual information while a speaker can output audio information.

The processor 606 reads data and instructions. The data and instructions can be stored locally, received from an external source, or accessed from removable media.

The wireless Wi-Fi interface 608 is similar to the Wi-Fi interface 139. A Wi-Fi connection 22, 28 can be established with the server 300.

The wireless BLE interface 610 is similar to the Bluetooth interface 140. A BLE connection 20, 30 can be established with the electronic lock 100.

The power supply 612 provides power to the processor 606.

The memory 614 includes software applications 620 and an operating system 622. The memory 614 contains data and instructions that are usable by the processor to implement various functions of the mobile device 200,400.

The software applications 620 can include applications usable to perform various functions on the mobile device 200,400. One such application is an electronic lock application 624. In a particular embodiment, when the electronic lock application 624 is operating on the admin mobile device 200, the electronic lock application 624 can be configured to provide a user interface, setup/activate the electronic lock 100, generate an administrative user account that is associated with the electronic lock 100, present the administrative user 12 with a random pairing passcode for the electronic lock 100 (which may be reset or turned off by the administrative user 12), send (e.g., via a BLE connection 20 with the electronic lock 100 or Wi-Fi connection 22,24) the pairing passcode to the electronic lock 100 for storage, and store the pairing passcode locally on the admin mobile device 200 and/or the server 300. In another embodiment, the electronic lock application 624 may provide a selectable 'add user' feature, which when selected, enables the administrative user 12 to add another user (e.g., the guest user 18) to have access to the electronic lock 100, receive administrative user-input of the guest user's electronic contact information (e.g., mobile device phone number, email address, messaging application identifier, social media account identifier), generate a link that can be shared with the guest user 18 that allows the guest user 18 to access the electronic lock application 624 and create a guest user account that is associated with the administrative user account and the electronic lock 100, and send a message including the link to the guest mobile device 400 via the received electronic contact information.

In a particular embodiment, responsive to receiving the link and receiving a selection of the link, the electronic lock application 624 may be installed on the guest mobile device 400 and used to create a guest user account that is associated with the administrative user account and the electronic lock 100. When the electronic lock application 624 is operating on the guest mobile device 400, the electronic lock application 624 can be configured to determine when the guest mobile device 400 is in proximity to the electronic lock 100, determine that the guest mobile device 400 is not paired with the electronic lock 100 via a BLE connection, and provide (e.g., display), in a user interface, the pairing passcode and instructions for pairing the guest mobile device 400 with the electronic lock 100. According to an embodiment, when the pairing passcode is entered using the keypad 120 of the electronic lock 100, the electronic lock 100 may be triggered to enter a Bluetooth pairing mode. The electronic lock application 624 may be further configured to determine that the electronic lock 100 is in Bluetooth pairing mode and perform a pairing process with the electronic lock 100, which when completed, enables the guest user 18 to perform at least a subset of electronic lock actions (e.g., actuate the electronic lock 100, add an access/actuation passcode) via the electronic lock application 624.

Figure 7:
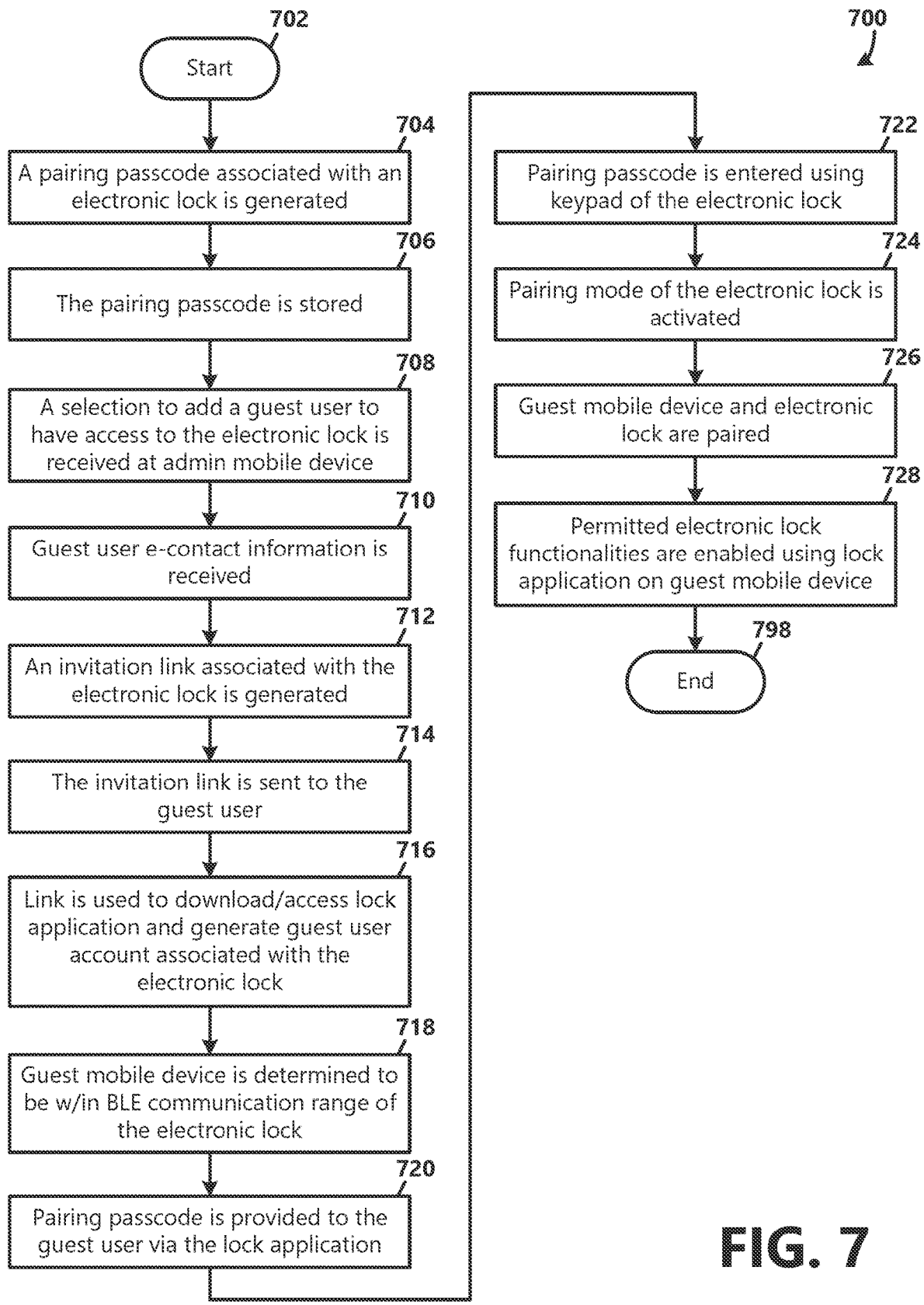
FIG. 7 illustrates a flowchart of a method of providing secure passcode-triggered wireless communication pairing of a mobile device with the electronic lock within the environment of FIG. 1.

With reference now to FIG. 7, an example flowchart of a method 700 of providing secure passcode-triggered wireless communication pairing of a mobile device, such as the guest mobile device 400, with the electronic lock 100 is shown. The method 700 starts at start operation 702 and proceeds to operation 704 where a pairing passcode associated with the electronic lock 100 is generated. In some examples, the pairing passcode is generated by the electronic lock 100. For example, the pairing passcode may be generated upon initial setup/activation of the electronic lock 100. In other examples, the pairing passcode is generated at the admin mobile device 200. For example, the pairing passcode may be presented to the administrative user 12 in a user interface provided by the electronic lock application 624 operating on the admin mobile device 200, and the administrative user 12 may be enabled to select to generate a new (random) pairing passcode or to override the pairing passcode with a user-selected pairing passcode. In an alternative example, the pairing passcode may be ore-stored in the electronic lock 100, and presented to the administrative user 12 either via communication to the admin mobile device 200 or by printing the initial pairing passcode in documentation that accompanies the electronic lock at the time of purchase.

At operation 706, the pairing passcode may be stored. According to an embodiment, the pairing passcode is stored in memory 138 at the electronic lock 100. For example, if the admin mobile device 200 is within BLE communication range of the electronic lock 100 and if the pairing passcode is generated at the admin mobile device 200, the admin mobile device 200 may transmit the pairing passcode to the electronic lock 100 via a BLE connection 20, where the pairing passcode may be locally stored. As another example, if the electronic lock 100 is Wi-Fi-enabled (e.g., comprises a Wi-Fi interface 139) and if the pairing passcode is generated at the admin mobile device 200 when the admin mobile device 200 is not within BLE communication range of the electronic lock 100, the admin mobile device 200 may transmit the pairing passcode to the electronic lock 100, which may be relayed via the server 300, via a Wi-Fi connection 24 or other wireless connection. In some examples, the pairing passcode may additionally be stored at one of or both admin mobile device 200 and the server 300.

At operation 708, a selection to allow the guest user 18 to have access to the electronic lock 100 is received at the admin mobile device 200. For example, the electronic lock application 624 operating on the admin mobile device 200 may provide a selectable 'add guest user' feature. According to an aspect, the 'add guest user' feature may be utilized to associate the guest user 18 with the electronic lock 100 even when the admin mobile device 200 is not within BLE communication range of the electronic lock 100.

At operation 710, the guest user's electronic contact information (e.g., email address, mobile phone number, messaging application address/identifier, social media account identifier) may be input by the administrative user 12 using the electronic lock application 624. In some examples, additional information may be requested by the electronic lock application 624 and input by the administrative user 12. For example, the additional information may include the guest user's name and may further include guest user access control options. In some embodiments, the guest user's electronic contact information and additional information may be communicated 22 to and stored on the server 300 in association with the administrative user's account and the electronic lock 100.

At operation 712, an invitation link may be generated by the electronic lock application 624, wherein the link may include embedded information that associates the link with the administrative user's account and the electronic lock 100. In some examples, the invitation link may be generated by the server 300 and communicated 22 to the admin mobile device 200.

At operation 714, a message including the invitation link may be transmitted to the guest mobile device 400 based on the electronic contact information provided by the administrative user 12. In some examples, the message is generated by and sent via the electronic lock application 624 operating on the admin mobile device 200. In other examples, the invitation link is copied and sent via another application 620 operating on the admin mobile device 200, such as an email application, a messaging application, a social media application, etc. In some examples, the message may include the pairing passcode. In some examples, the message may include information, such as instructions for downloading a copy of the electronic lock application 624, receiving the pairing passcode, and using the pairing passcode to pair the guest mobile device 400 with the electronic lock 100.

At operation 716, the message may be received by an application 620 operating on the guest mobile device 400, and the guest user may use the invitation link included in the message to download a copy of the electronic lock application 624. For example, the invitation link, when selected, may be configured to instruct the admin mobile device 200 to access a downloadable copy of the electronic lock application 624 (e.g., available via a mobile application store or a webpage provided by the server 300) or to open the electronic lock application 624 if the application was previously installed on the guest mobile device 400. Selection of the invitation link may further create a guest user account associated with the electronic lock 100. For example, the guest user account may be created and stored on the server 300, and the electronic lock application 624 may communicate with the server 300 via the Wi-Fi interface 139 (or another wireless interface) to access the guest user account associated with the electronic lock 100. In some examples, some guest user account information may be stored locally on the guest mobile device 400 by the electronic lock application 624. As mentioned above, the link may include embedded information that associates the link with the administrative user account and the electronic lock 100 such that, in some examples, when the guest user 18 uses the link to download or access the electronic lock application 624, the guest user account may be automatically populated with the guest user's electronic contact information and additional information previously input by the administrative user 12 and saved on the server 300. In some examples, the guest user's electronic contact information and additional information is automatically populated by the server 300. In other examples, the guest user's electronic contact information and additional information is automatically populated by the electronic lock application 624 operating on the guest mobile device 400 to the electronic lock 100.

At operation 718, a determination may be made that the guest mobile device 400 is within BLE communication range of the electronic lock 100. For example, the guest user 18 may open and log into the electronic lock application 624 on the guest mobile device 400, and the electronic lock application 624 may be configured to detect that the guest mobile device 400 is within proximity to and within BLE communication range of the electronic lock 100. In some examples, the electronic lock application 624 may be further configured to detect or determine whether the guest mobile device 400 and the electronic lock 100 have been paired (e.g., whether a BLE communication channel has been established between the guest mobile device 400 and the electronic lock 100).

At operation 720, upon determining that the guest mobile device 400 is within BLE communication range of the electronic lock 100 and that the guest mobile device 400 has not been paired with the electronic lock 100, the electronic lock application 624 may display, in a user interface provided by the application, the pairing passcode. In some examples, the pairing passcode is provided to the electronic lock application 624 by the server 300. For example, the pairing passcode may be provided to the electronic lock application 624 upon creation of the guest user account.

As should be appreciated, in some embodiments, such as when certain accessibility options are enabled on the guest mobile device 400, the pairing passcode may be played audibly via a speaker of the guest mobile device 400.

At operation 722, the guest user 18 may enter the pairing passcode into the electronic lock 100 using the keypad 120 of the electronic lock 100.

At operation 724, upon successful entry of the pairing passcode, the electronic lock 100 may enter into a wireless (e.g., BLE) communication pairing mode. For example, the electronic lock 100 may be configured to validate the entered pairing passcode with the pairing passcode stored locally in the electronic lock memory 138.

At operation 726, the guest mobile device 400 and the electronic lock 100 may pair with each other (e.g., establish a Bluetooth® connection).

Upon success pairing, at operation 728, the guest mobile device 400 may be enabled to communicate with the electronic lock 100 and be permitted to perform a subset of commands associated with the electronic lock 100. For example, the subset of commands may be based on preconfigured or administrative user-specified access control options. Non-limiting examples of commands associated with the electronic lock 100 may include a lock actuation command, an unlock actuation command, set an actuation passcode that can be entered into the keypad 120 of the electronic lock 100 for actuating the electronic lock, change other electronic lock settings, etc. In some embodiments, after the guest mobile device 400 is paired with the electronic lock 100, the pairing passcode may be disabled. In some examples, the electronic lock 100 may be further configured to generate and store a new pairing passcode. When the electronic lock 100 is Wi-Fi-enabled, the electronic lock 100 may communicate via Wi-Fi connection 24 the new pairing passcode with the server 300.

The method 700 may end at end operation 728.

Figure 8:
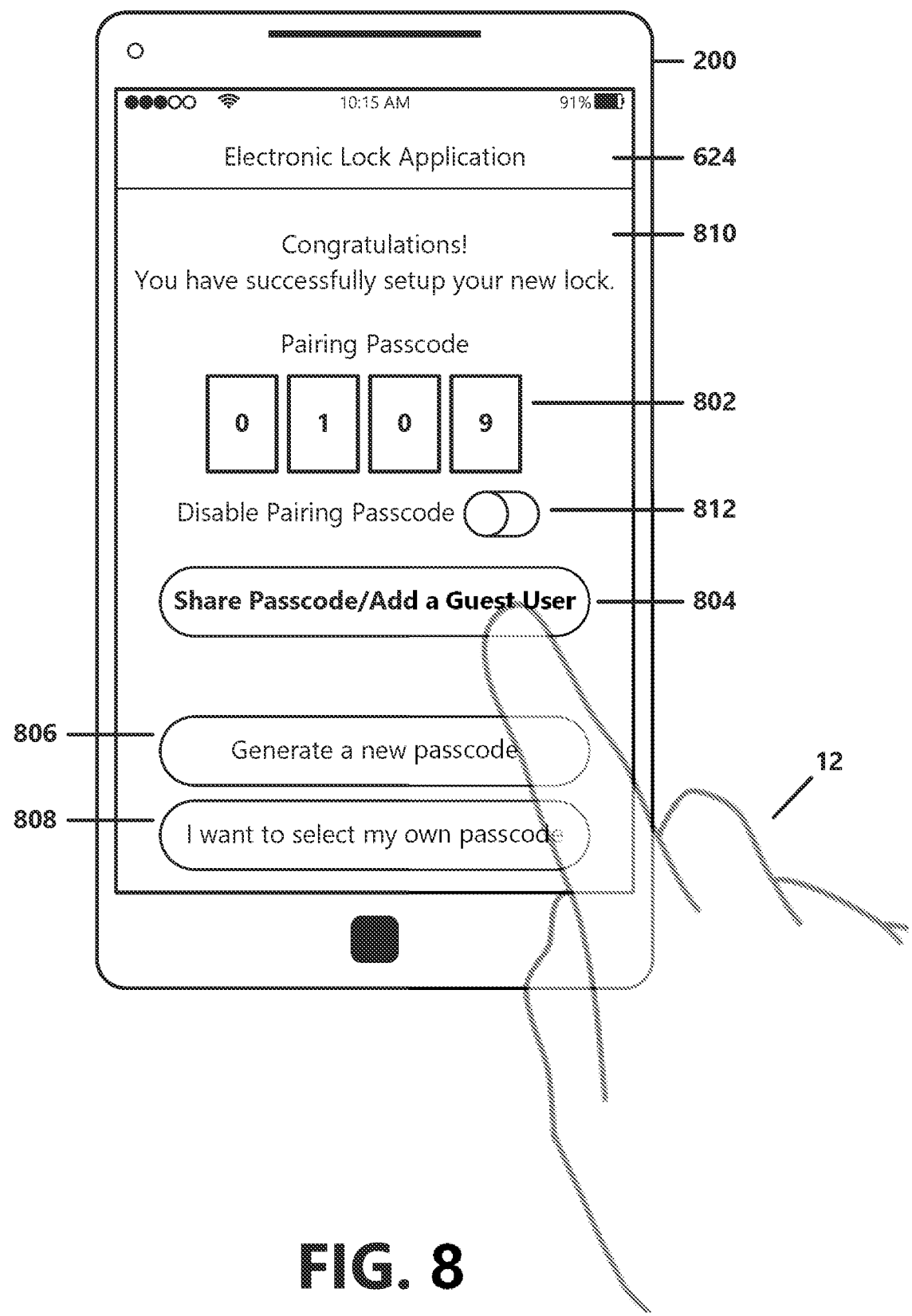
FIG. 8 illustrates a pictorial representation of an admin mobile device executing an electronic lock application that provides a user interface for displaying a pairing passcode that can be shared with a guest user.

FIGS. 8-13 show various pictorial representations of aspects of providing secure passcode-triggered wireless communication pairing of a guest mobile device 400 with the electronic lock 100. With reference now to FIG. 8, an example representation of a user interface 810 of the electronic lock application 624 is shown displayed on a screen of an example representation of the admin mobile device 200. For example, the user interface 810 shown in FIG. 8 is a representation of a user interface that may be displayed upon successful setup or installation of the electronic lock 100. The user interface 810 may be configured to display a pairing passcode 802 that may be generated by the electronic lock 100 based on the successful setup. As mentioned previously, the administrative user 12 may be enabled to create a new pairing passcode 802 using the electronic lock application 624. For example, a 'generate a new pairing passcode' option 806 may be provided in the user interface 810, which when selected, instructs the electronic lock application 624 to generate a new pairing passcode 802. As another example, a 'select my own passcode' option 808 may be provided in the user interface 810, which when selected, may allow the administrative user 12 to enter a pairing passcode 802 selected by the administrative user. In some examples, a disable option 812 may be provided in the user interface 810, which when selected, may disable the pairing passcode 802 from use. The pairing passcode 802 may be selectively enabled via a subsequent toggling or actuation of the disable option 812. According to an aspect, an 'add a guest user' option 804 may be provided in the user interface 810, which when selected, enables a guest user account to be created and associated with the electronic lock 100.

Figure 9:
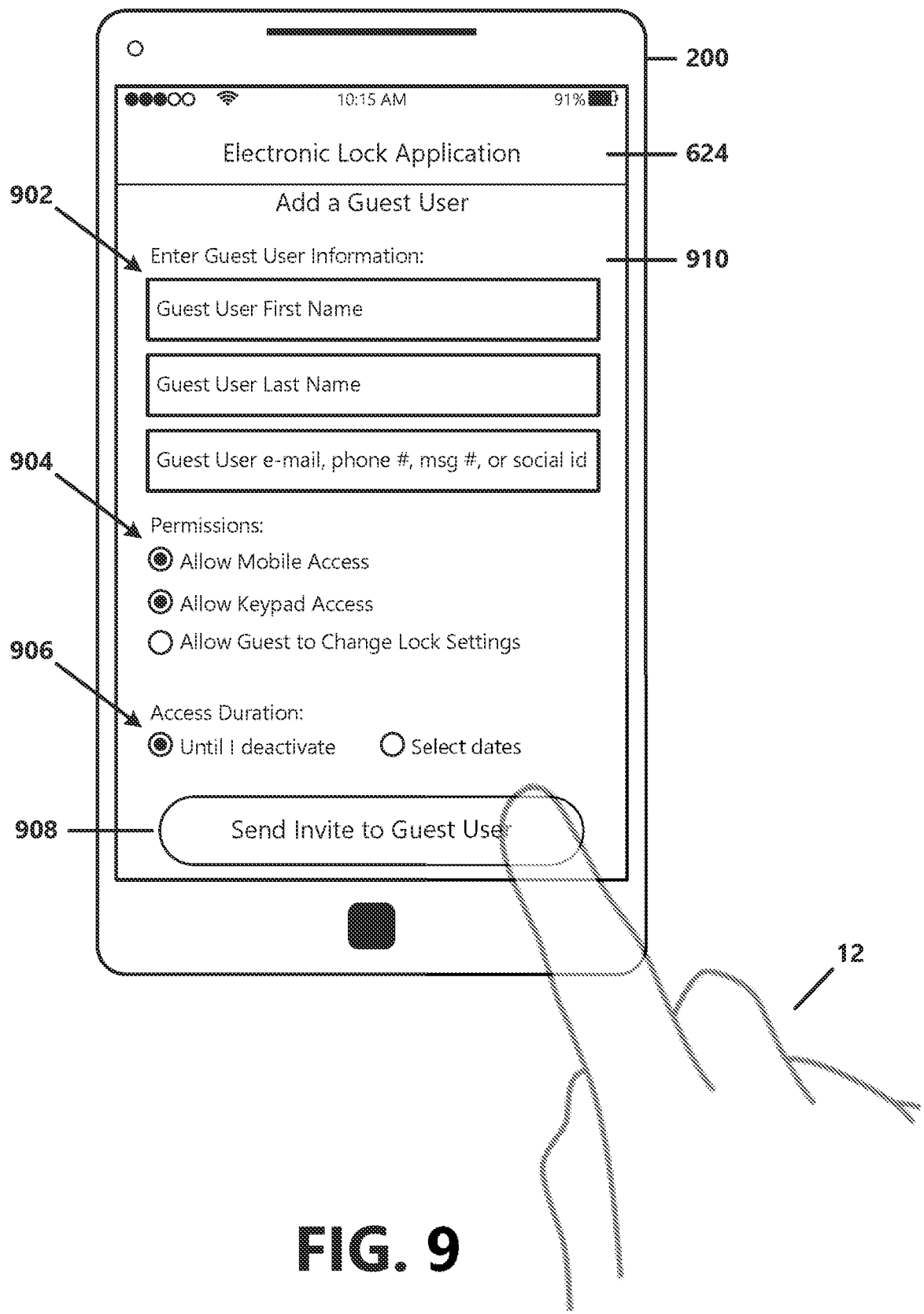
FIG. 9 illustrates a pictorial representation of an admin mobile device executing the electronic lock application that provides a user interface for sharing the pairing passcode with the guest user.

With reference now to FIG. 9, an example representation of another user interface 910 of the electronic lock application 624 is shown displayed on the screen of the admin mobile device 200. For example, the user interface 910 shown in FIG. 9 is a representation of a user interface that may be displayed when a selection of the 'add a guest user' option 804 illustrated in FIG. 8 is made. According to an example, the user interface 910 may include at least one input field 902 for enabling the administrative user 12 to enter the guest user's electronic contact information (e.g., email address, mobile phone number, messaging application address/identifier, social media account identifier).

Additional input fields 902 may be provided for entering additional information, such as the guest user's name. In some examples, various access control options may be provided in the user interface 910 for enabling the administrative user 12 to select one or more permission options 904 and settings 906 to associate with the guest user's account. Some non-limiting permission options 904 include an option to allow the guest user 18 to use the guest mobile device 400 to control the electronic lock 100, an option to allow the guest user 18 to use the keypad 120 (e.g., and be provided or to select a guest user actuation passcode) to control the electronic lock 100, and an option to allow the guest user 18 to change settings of the electronic lock 100. One example setting 906 includes an activation period setting, in which the administrative user 12 may be able to select a time period during which the guest user 18 is allowed to control the electronic lock 100. As should be appreciated, the permission options 904 and settings 906 illustrated in the user interface 910 are for purposes of example; additional or alternative permission options 904 and settings 906 are possible and are within the scope of the present disclosure.

According to an aspect, the user interface 910 may include a send option 908, which when selected, may instruct the electronic lock application 624 to send an invitation message to the guest user 18. In some examples, the send option 908 may be configured to enable the administrative user 12 to select another application 620 operating on the admin mobile device 200 to send the invitation message. In some examples, when the invitation message is sent to the guest user 18, the electronic lock application 624 may communicate via WiFi connection 22 with the server 300 to store the guest user information in association with the electronic lock 100.

Figure 10:
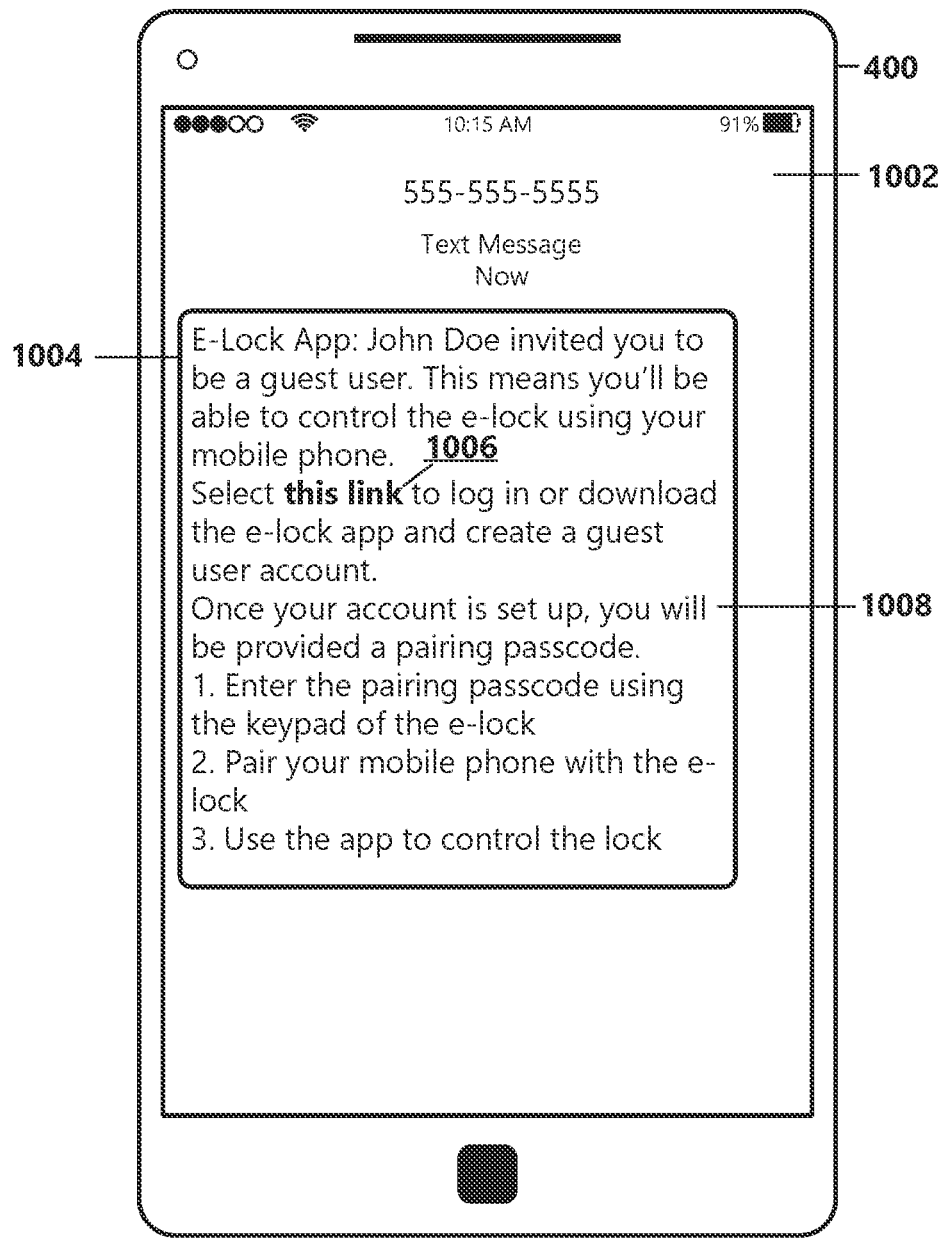
FIG. 10 illustrates a pictorial representation of a guest mobile device receiving a message comprising a link and instructions for creating a guest user account associated with the electronic lock.

With reference now to FIG. 10, an example messaging application user interface 1002 is shown displayed on the screen of the guest mobile device 400. For example, an example invitation message 1004 that may be generated and sent by the electronic lock application 624 operating on the admin mobile device 200 may be displayed in the messaging application user interface 1002. As should be appreciated, the format of the invitation message 1004 may differ based on the communication method. For example, the example invitation message 1004 illustrated in FIG. 10 is a text message displayed in a text messaging application user interface 1002. However, in other examples, the invitation message 1004 may be an email, social media message, or other type of message. As illustrated, the invitation message 1004 may include a link 1006 associated with the guest user information and the electronic lock 100. As mentioned previously, selection of the link 1006 may instruct the guest mobile device 400 to access a downloadable copy of the electronic lock application 624 (e.g., available via a mobile application store or a webpage provided by the server 300) or to open the electronic lock application 624 if the application was previously-installed on the guest mobile device 400. Selection of the link 1006 may further provide an instruction to create a guest user account associated with the electronic lock 100. In some examples, instructions 1008 may also be included in the invitation message 1004. In some examples, the pairing passcode 802 may also be included in the invitation message 1004.

Figure 11:
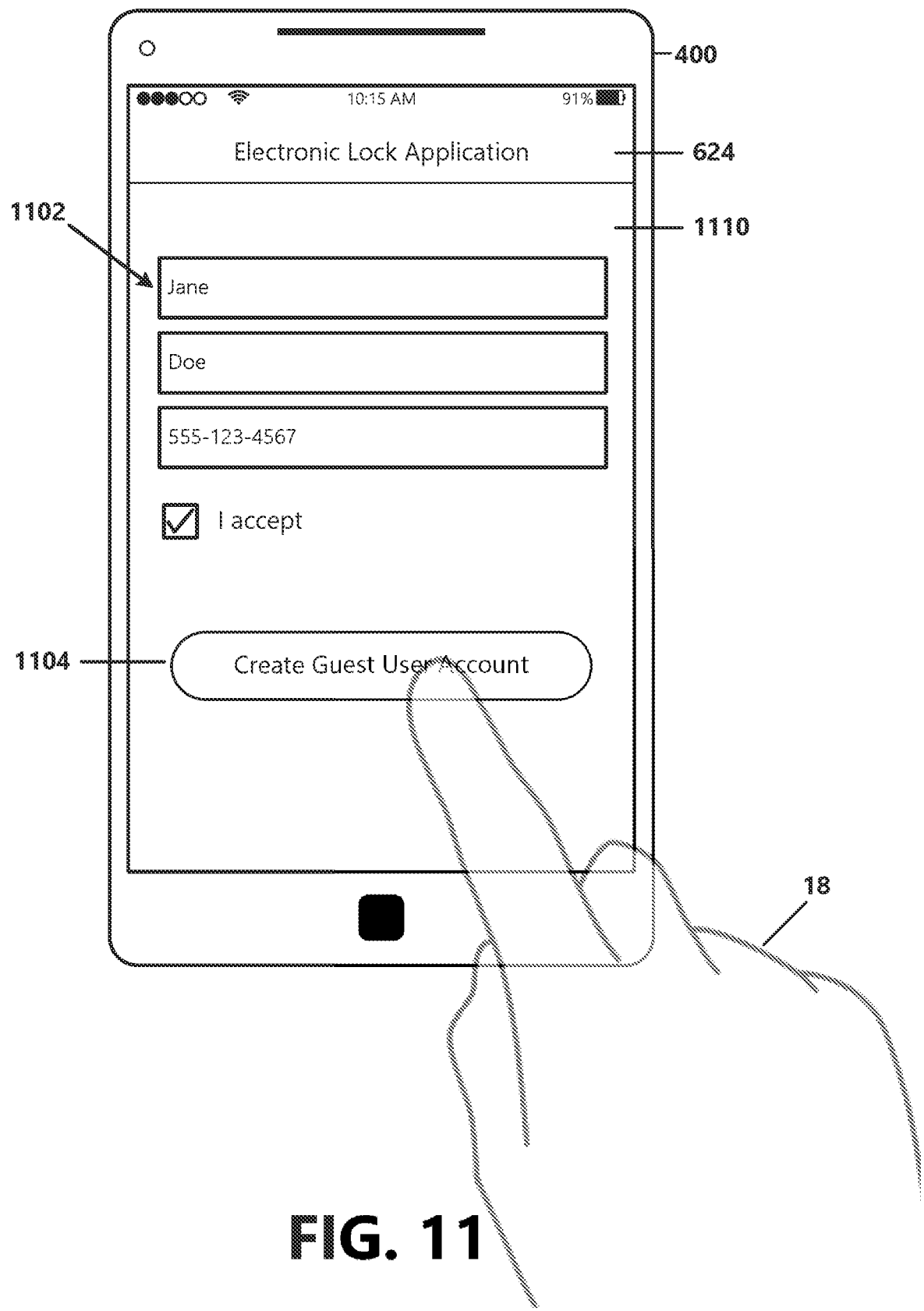
FIG. 11 illustrates a pictorial representation of the guest mobile device executing the electronic lock application that provides a user interface for creating the guest user account associated with the electronic lock.

With reference now to FIG. 11, an example representation of a user interface 1110 of the electronic lock application 624 is shown displayed on the screen of the guest mobile device 400. For example, the user interface 1110 shown in FIG. 11 is a representation of a user interface that may be displayed when a selection of the link 1006 provided in the invitation message 1004 is made and the electronic lock application 624 is installed or accessed on the guest mobile device 400. In some examples, the user interface 1110 may include one or more input fields 1102 for enabling the guest user 18 to input guest user information (e.g., guest user's name, mobile phone number, email address) for association with the guest user account. In some examples, one or more of the input fields 1102 may be prepopulated with the guest user information based on the guest user information input by the administrative user 12 when selecting to add the guest user 18 as a guest user of the electronic lock 100. For example, the server 300 may store and provide the guest user information to the electronic lock application 624 operating on the guest mobile device 400. The user interface 1110 may further include a 'create account' option 1104, which when selected, creates and stores the guest user account on the server 300. According to an aspect upon creation of the guest user account, the pairing passcode 802 may be provided to the electronic lock application 624 operating on the guest mobile device 400.

Figure 12:
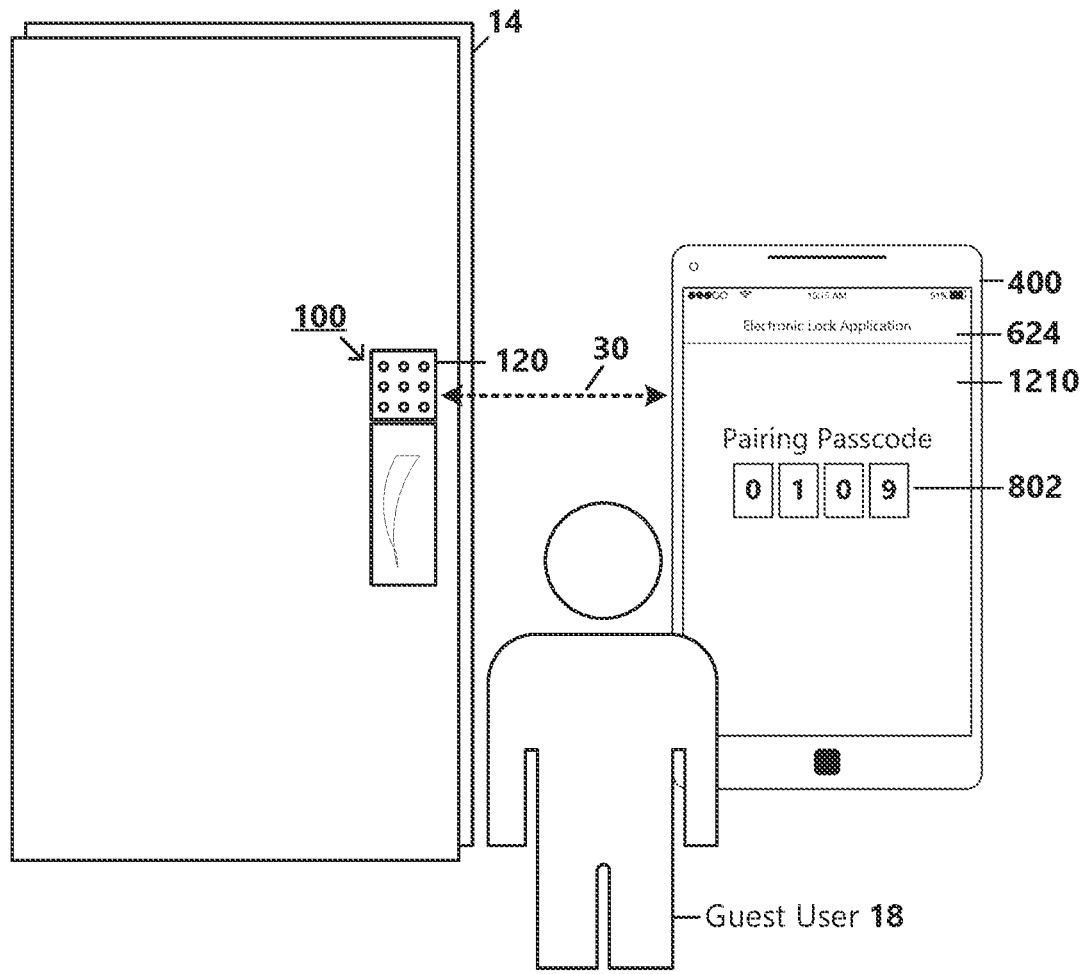
FIG. 12 illustrates a pictorial representation of the guest mobile device executing the electronic lock application that provides a user interface for displaying the pairing passcode that can be used to pair the guest mobile device with the electronic lock.

With reference now to FIG. 12, an illustration is provided showing the guest user 18 within proximity of the electronic lock 100 and the pairing passcode 802 being displayed on the guest mobile device 400. According to an aspect, when the guest user 18 is within proximity of the electronic lock 100, the guest user 18 may open and log into the electronic lock application 624 on the guest mobile device 400. The electronic lock application 624 operating on the guest mobile device 400 may determine that the guest mobile device 400 is within BLE communication range of the electronic lock 100 and, in some examples, that a BLE connection 30 has not been established between the guest mobile device 400 and the electronic lock 100. Based on these determinations, the electronic lock application 624 may provide the pairing passcode 802 in a user interface 1210 for display on the screen of the guest mobile device 400. For example, the pairing passcode 802 may be displayed to the guest user 18 so that the guest user 18 can enter the pairing passcode 802 using the keypad 120 of the electronic lock 100 to pair the guest mobile device 400 with the electronic lock 100 without requiring the guest user 18 to have access to the interior side of the door 14 for actuation of the pairing button 119 located on the interior assembly 108 of the electronic lock 100. That is, successful entry of the pairing passcode 802 may trigger the electronic lock 100 to enter into a wireless (e.g., BLE) communication pairing mode. The electronic lock 100 and the guest mobile device 400 may then establish a BLE connection 30.

Figure 13:
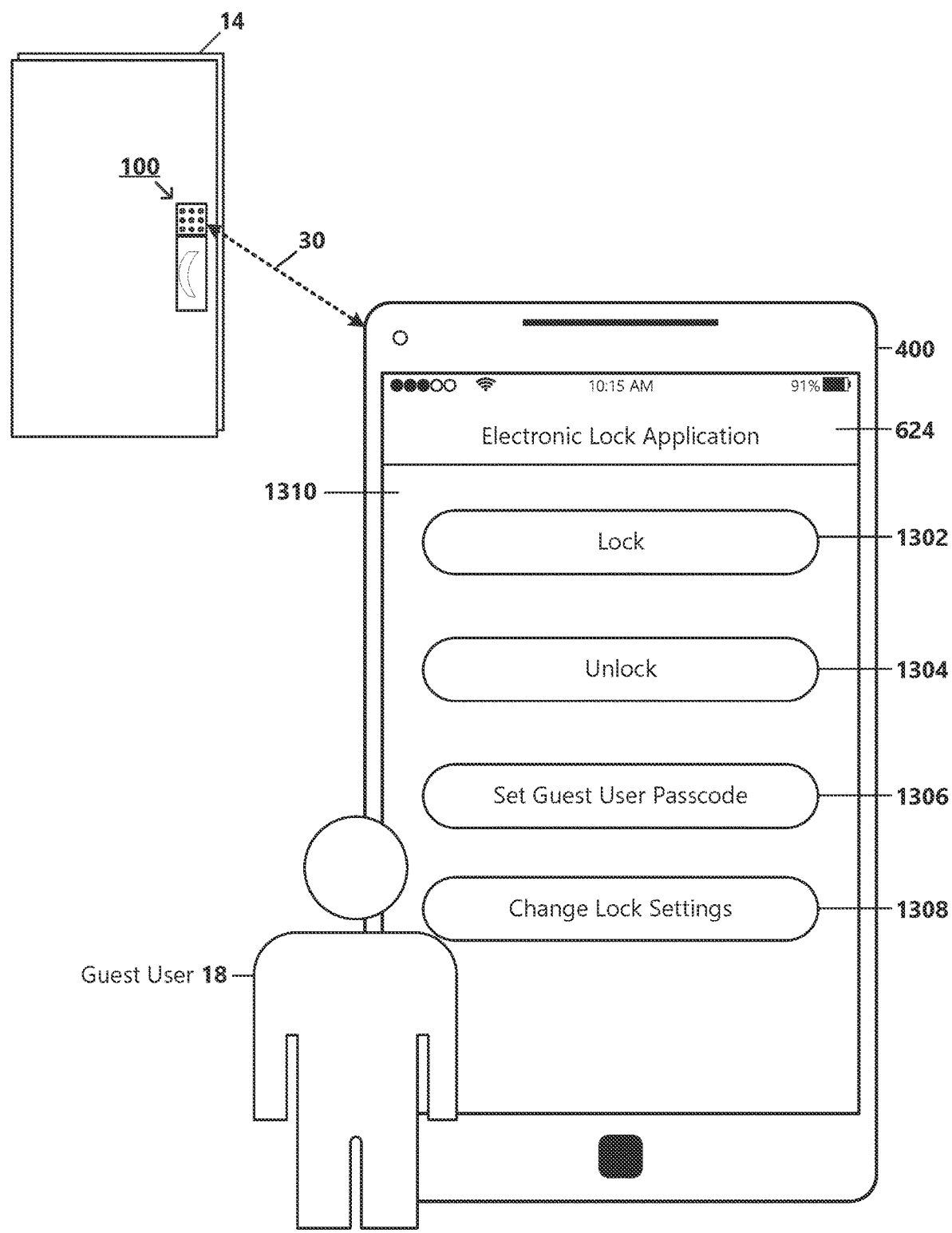
FIG. 13 illustrates a pictorial representation of the guest mobile device executing the electronic lock application that, once paired, provides electronic lock functionality options that can be actuated using the guest mobile device.

With reference now to FIG. 13, an example representation of a user interface 1310 of the electronic lock application 624 is shown displayed on the screen of the guest mobile device 400. For example, the user interface 1310 shown in FIG. 13 is a representation of a user interface that may be displayed after successful pairing of the guest mobile device 400 with the electronic lock 100. The user interface 1310 may include various commands associated with the electronic lock 100 that can be selected by the guest user 18 to control the electronic lock 100. The various commands provided in the user interface 1310 may be based on preconfigured or administrative user-selected access control options. Non-limiting examples of commands that may be provided in the user interface 1310 include a lock actuation command 1302, an unlock actuation command 1304, a 'set passcode' command 1306 that may allow the guest user 18 to set an actuation passcode that can be entered into the keypad 120 of the electronic lock 100 for actuating the electronic lock, an option 1308 to change other electronic lock settings, etc. As should be appreciated, the commands illustrated in the user interface 1310 are for purposes of example; additional or alternative commands are possible and are within the scope of the present disclosure.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for providing secure passcode-triggered wireless communication pairing of a mobile device with an electronic lock, the system comprising:
  at least one processor;
  a memory communicatively connected to the at least one processor, the memory storing instructions which, when executed, cause the system to:
    provide, on a first mobile device, a user interface;
    receive, via the user interface, a selection to allow a guest user to pair a second mobile device with the electronic lock;
    receive, via the user interface, contact information associated with the guest user;
    generate an invitation link associated with the electronic lock;
    send a message including the invitation link to the second mobile device using the contact information associated with the guest user, wherein the invitation link, when selected, allows the second mobile device to:
      install an application to operate on the second mobile device;

use the application to create a guest user account associated with the electronic lock; and use the application to display a pairing passcode associated with the electronic lock that, when entered using a keypad of the electronic lock, initiates a wireless communication pairing mode that enables the electronic lock to pair with the second mobile device when the second mobile device is within wireless communication range of the electronic lock.

2. The system of claim 1, wherein:
pairing the electronic lock with the second mobile device allows the application operating on the second mobile device to communicate with the electronic lock via a wireless communication channel; and
wherein, via the wireless communication channel, the application is configured to communicate a guest user-selected command to control a functionality associated with the electronic lock.

3. The system of claim 1, wherein the selection to allow the guest user to pair the second mobile device with the electronic lock is received from an administrative user associated with the electronic lock.

4. The system of claim 1, wherein the instructions further cause the system to:
in response to a request for a new pairing passcode, generate the new pairing passcode; and
when the first mobile device is within wireless communication range of the electronic lock, send the new pairing passcode to the electronic lock.

5. The system of claim 4, wherein the instructions further cause the system to:
when the electronic lock is Wi-Fi-enabled, send the new pairing passcode to an administrative user account on a server to be stored in association with the electronic lock and to be sent to the electronic lock via a Wi-Fi connection.

6. The system of claim 1, wherein the instructions further cause the system to:
send the contact information associated with the guest user to an administrative user account on a server to be stored in association with the electronic lock such that when the application is installed on the second mobile device using the invitation link, the guest user account is automatically populated with the contact information associated with the guest user.

7. The system of claim 1, wherein the instructions further cause the system to:
receive, via the user interface, an access control option for the guest user; and
when the guest user account is created, associating the access control option with the guest user account.

8. The system of claim 7, wherein the access control option includes an option to allow the guest user to create an actuation passcode that, when entered using the keypad of the electronic lock, actuates a bolt of the electronic lock to move between a locked position and an unlocked position.

9. The system of claim 1, wherein the pairing passcode is not operable to control locking or unlocking functionalities of the electronic lock.

10. The system of claim 1, wherein:
the wireless communication is Bluetooth communication; and
the mobile device is a Bluetooth-enabled device.

11. The system of claim 1, the electronic lock comprising:
a latch assembly including a bolt movable between a locked position and an unlocked position;
a motor configured to receive actuation commands causing the motor to move the bolt from the locked position to the unlocked position or from the unlocked position to the locked position;
the keypad for receiving a user input;
a wireless circuit configured to communicate wirelessly with an application installed on the mobile device;
at least one processor;
a memory communicatively connected to the at least one processor, the memory storing the pairing passcode and instructions which, when executed, cause the electronic lock to:
receive, via the keypad, user input of the pairing passcode; and
enter into a wireless communication pairing mode that enables the electronic lock to pair with the second mobile device when the second mobile device is within wireless communication range of the electronic lock.

12. The system of claim 11, wherein the instructions cause the electronic lock to:
pair with the second mobile device;
receive an actuation command from the application installed on the second mobile device; and
perform the actuation command to cause the motor to move the bolt from the locked position to the unlocked position or from the unlocked position to the locked position.

13. The system of claim 11, wherein the pairing passcode is a limited-use passcode.

14. The system of claim 11, wherein the pairing passcode, when input via the keypad, is not operable to actuate locking or unlocking functionalities of the electronic lock.

15. The system of claim 11, wherein the instructions further cause the electronic lock to generate the pairing passcode.

16. The system of claim 11, wherein the wireless communication is Bluetooth communication, and the second mobile device is a Bluetooth-enabled device.

17. The system of claim 11, wherein the instructions cause the electronic lock to:
after establishing the wireless communication channel with the second mobile device:
disable the pairing passcode;
generate a new pairing passcode; and
store the new pairing passcode.

* * * * *